United States Patent
Hoose

[19]

[11] Patent Number: 6,017,047

[45] Date of Patent: Jan. 25, 2000

[54] VEHICLE SUSPENSION

[76] Inventor: Howard Hoose, Onesquethaw Creek Rd., Feura Bush, N.Y. 12067

[21] Appl. No.: 08/848,517

[22] Filed: Apr. 28, 1997

[51] Int. Cl.[7] .................................................... B62K 1/00
[52] U.S. Cl. ........................................ 280/276; 280/279
[58] Field of Search ................................... 280/275, 276, 280/277, 279, 283, 286; 267/226; 180/219

[56] References Cited

U.S. PATENT DOCUMENTS

| | | | |
|---|---|---|---|
| 703,632 | 7/1902 | Zimmerman | 280/279 |
| 1,223,572 | 4/1917 | Drew | 280/279 |
| 1,452,436 | 4/1923 | Pullin . | |
| 1,527,133 | 2/1925 | Harley | 280/279 |
| 2,485,484 | 10/1949 | Dean | 280/279 |
| 4,145,067 | 3/1979 | Ceriani . | |
| 4,147,371 | 4/1979 | Morita et al. . | |
| 4,278,266 | 7/1981 | Inoue et al. . | |
| 4,512,592 | 4/1985 | Yoshioka | 280/279 |
| 4,660,683 | 4/1987 | Hayashi et al. . | |
| 4,735,276 | 4/1988 | Burton . | |
| 5,209,319 | 5/1993 | Buell . | |
| 5,380,826 | 1/1995 | Robinson . | |
| 5,582,395 | 12/1996 | Cheng | 267/219 |
| 5,855,388 | 1/1999 | Brewer | 280/288.4 |

FOREIGN PATENT DOCUMENTS

| | | |
|---|---|---|
| 0 245 221 | 4/1987 | European Pat. Off. . |
| 0507 088 A1 | 2/1992 | European Pat. Off. . |
| 1027087 | 10/1950 | France . |
| 1076590 | 4/1953 | France . |
| 837 508 | 11/1950 | Germany . |
| 1-293289 | 5/1988 | Japan . |

*Primary Examiner*—Lanna Mai
*Assistant Examiner*—Jeff Restifo
*Attorney, Agent, or Firm*—Hoffman, Warnick & D'Alessandro

[57] ABSTRACT

A suspension for at least a two-wheeled vehicle and at least two-wheeled vehicle with such a suspension. The suspension includes two shock absorbing systems independently operable between the vehicle's frame and wheel.

12 Claims, 3 Drawing Sheets

VEHICLE SUSPENSION

BACKGROUND OF THE INVENTION

1. Technical Field

The present invention relates generally to a suspension for a two-wheeled vehicle and the two-wheeled vehicle with such a suspension. More particularly, the present invention relates to a two-wheeled vehicle suspension having two shock absorbing systems independently operable between a two-wheeled vehicle's frame and wheel.

2. Related Art

Heretofore, the related art has provided two wheeled vehicle suspensions, e.g., motorcycle or bicycle suspensions, containing only one shock absorbing member between the steering column and wheel. While these suspensions have been generally satisfactory, when rough terrain is encountered, the suspensions are limited to the stroke of the single shock absorber. Accordingly, once the single shock absorber has "bottomed out", the rider is subjected to direct transmittal of the ground undulations.

SUMMARY OF THE INVENTION

It is an advantage of the present invention to overcome the above mentioned deficiencies in the related art. In order to achieve this, the present invention provides a wheel suspension including: at least one elongate member having a first end and second end, a first shock absorber connected to the first end of the elongate member and a second shock absorber connected to the second end of the elongate member such that the first and second shock absorber act independently. As a result, the suspension can operate to cushion the ride with two shock absorbers that may be set to the same pressure or different pressures according to the operator's liking.

A further feature of the present invention is found in how the teachings of the present invention can be advantageously applied to a forked suspension of any wheeled vehicle and, in particular, any two-wheeled vehicle, e.g., a motorcycle or bicycle. When used on a two wheeled vehicle, the suspension members may be used to form a front fork such that the first shock absorber is attached to the steering column via a steering column frame and to the forks of the suspension. Through the shock absorber and fork connection, the structure adds further rigidity to the suspension, hence, preventing twisting of the forks when used to steer the vehicle.

Another advantage of the present invention is the selectability of the shock absorber members. For instance, hydraulic piston/cylinder system, a pneumatic piston/cylinder system, or a spring-based system, are all equally applicable within the scope of the present invention.

A further feature of the present invention is its capability to be retrofitted to older vehicles.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

While the present invention will be described in conjunction with a two wheeled vehicle, e.g., a motorcycle or bicycle, it should be noted as self-evident that the invention may be utilized in a variety of vehicle suspensions not illustrated herein. Furthermore, while the invention is illustrated for use with the front fork of a two-wheeled vehicle, it should be noted that the invention is equally applicable to the rear suspension of a vehicle.

Figure 1:
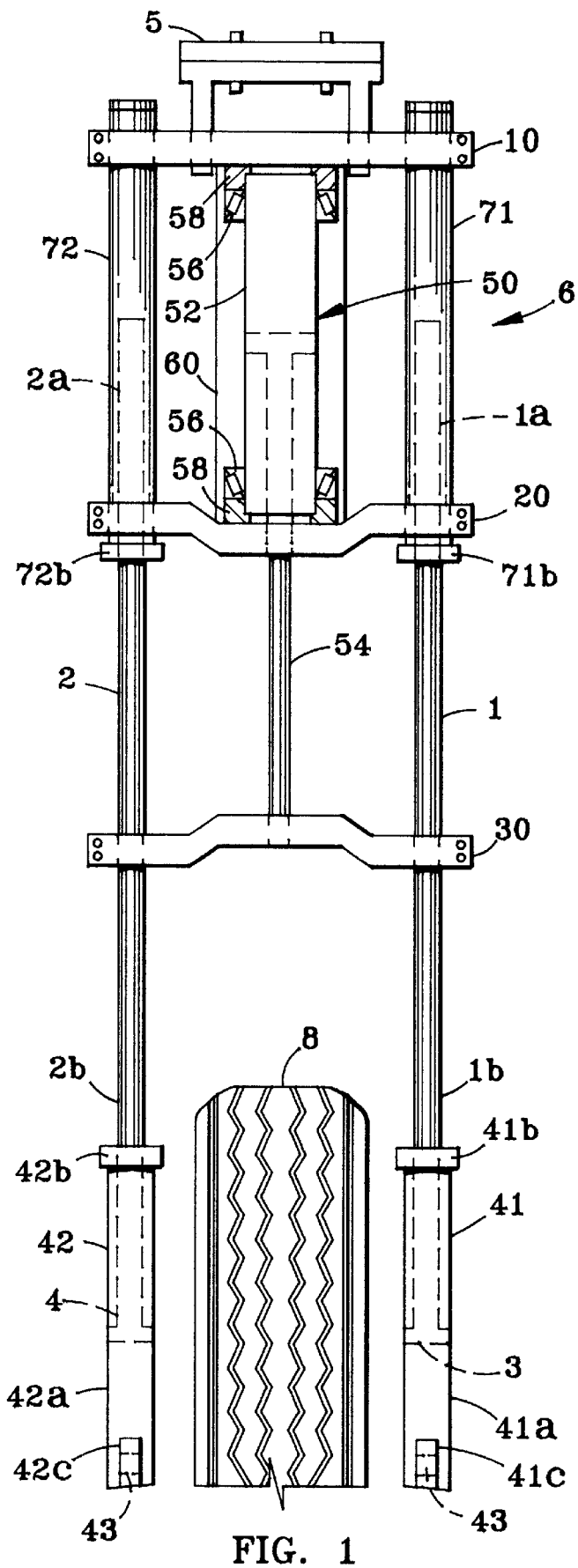
FIG. 1 shows a front view of a suspension in accordance with the present invention.

FIG. 1 shows a front view of the wheel suspension in accordance with the present invention. The suspension includes a pair of elongate members 1, 2 which act as a forked suspension, for example, for a motorcycle or bicycle. The elongate members 1, 2 may be constructed as solid rods or tubular members, and are conventionally formed of tempered steel.

At the lower ends 1b, 2b of each of the elongate members 1, 2, a lower shock absorber 41, 42 is provided. Each of the lower shock absorbers 41, 42 include a sleeve 41a, 42a which telescopically receive the lower ends 1b, 2b of the elongate members 1, 2. The sleeves 41a, 42a each include a seal 41b, 42b which seal the lower ends 1b, 2b of the elongate members inside the sleeves 41a, 42b. The lower ends of the sleeves 41a, 42a are also sealed, for example, by a plate welded to close off their lower openings.

To form a shock absorber, the lower ends 1b, 2b of the elongate members may include pistons 3, 4. In this way, the elongate members 1, 2 and sleeves 41, 42 form a sealed shock absorber when pressurized fluids, e.g. air or hydraulic fluid, are injected in the chambers formed between the pistons 3, 4 and the ends of the sleeves 41, 42. The resulting system is commonly referred to as a pneumatic piston/cylinder system or a hydraulic piston/cylinder system depending on the fluid used. As will be readily recognized by one having ordinary skill in the art, the chambers of the systems may be connected for fluid communication to reservoirs of pressurized fluid (not shown) for adjustability.

Figure 7:
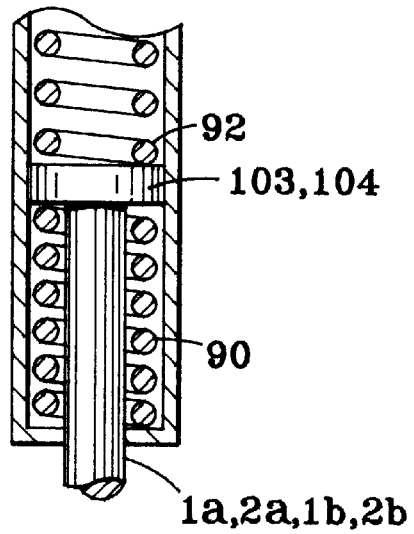
FIG. 7 shows a cross-sectional view of a spring-based shock absorber in accordance with an alternative embodiment of the present invention.
Figure 8:
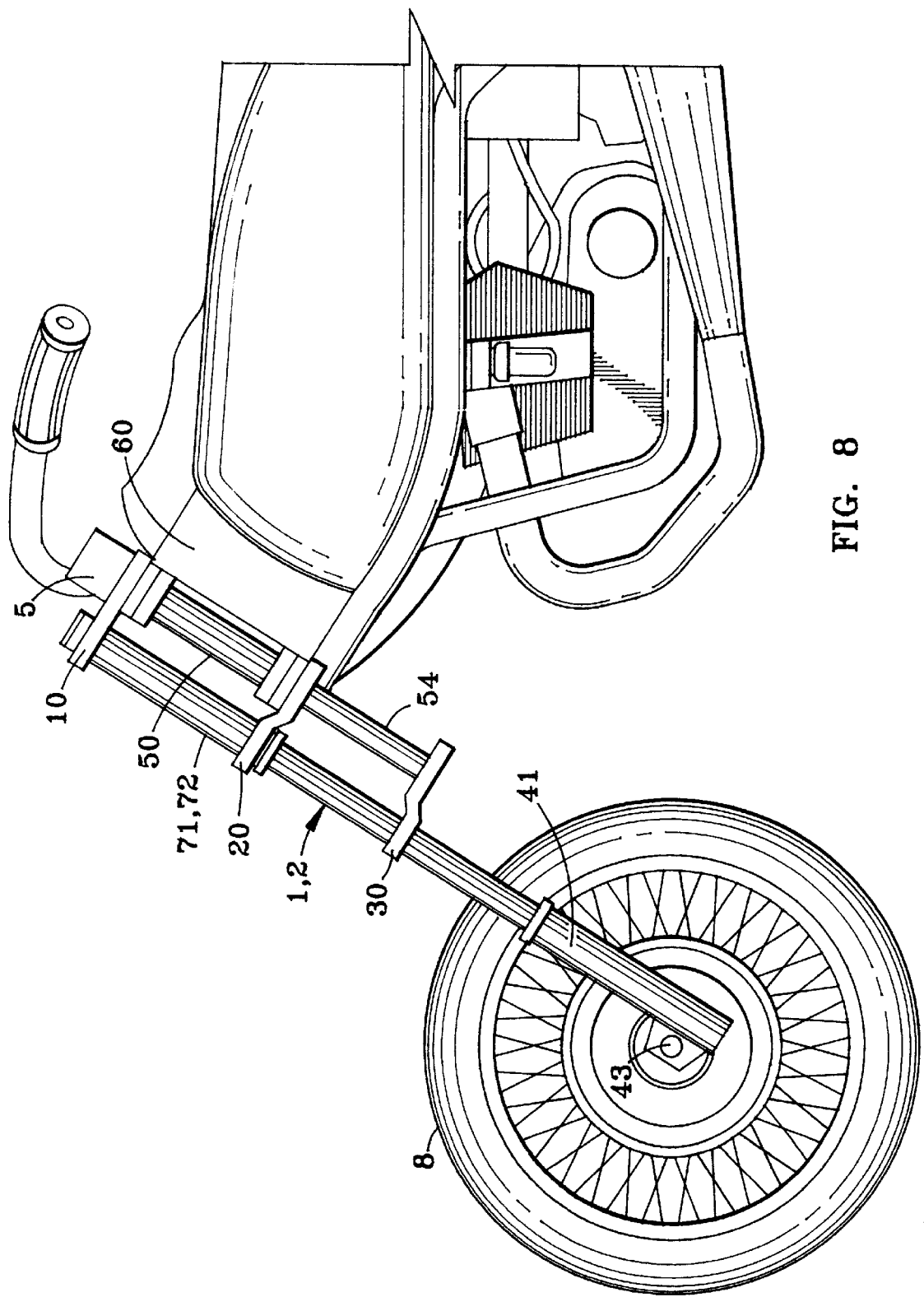

Alternatively, as shown in FIG. 7, the lower shocks 41, 42 may be created by a spring-based system. In this alternative embodiment, a spring 90 is placed below the piston 103, 104 and a spring 92 is placed above the piston 103, 104 to form a bi-directional cushion.

Returning to FIG. 1, at a lowermost portion of the shock absorber sleeves 41a, 42a, plates 41c, 42c are fixedly attached. The plates 41c, 42c include aligned apertures 43 therethrough to support an axle of a vehicle-supporting wheel 8. Hence, as the wheel travels along its path, the shock absorbers 41, 42 absorb the undulations to prevent transmittal of the shocks up the elongate members 1, 2.

When the suspension is used on a front of a two wheeled vehicle it is necessary for the suspension to provide steering.

In order to provide steerability, at the upper ends 1a, 2a of the elongate members, a steering frame 6 is provided. The steering frame 6 includes a pair of sleeves 71, 72 which telescopically receive the upper ends 1a, 2a of the elongate members 1, 2. The sleeves 71, 72 are fixedly attached by a pair of triple clamps 10, 20.

Figure 2:
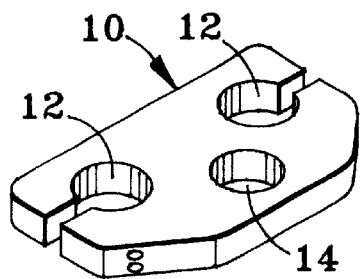
FIG. 2 shows an isometric view of a suspension component in accordance with the present invention.

FIG. 2 shows triple clamp 10. The plate 10 includes a pair of generally circular openings 12 with slots therein for changing the size of the apertures by tightening or loosening of at least one adjustable fastener (not shown). The clamp 10 also includes an aperture 14 positioned centrally in the plate but non-collinearly with the apertures 12. In accordance with the present invention, as shown in FIG. 1, the upper portions of sleeves 71, 72 are positioned in the apertures 12 and fixedly attached by tightening of the adjustable fastener.

Figure 3:
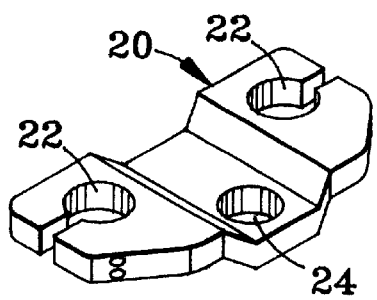
FIG. 3 shows an isometric view of a second suspension component in accordance with the present invention.

FIG. 3 shows the triple clamp 20 which is provided as a "dove-wing" triple clamp. The clamp 20 is formed of a cast or bent steel or aluminum plate with two co-planar outer sections and an intermediate lowered section. The clamp 20, similarly to clamp 10, includes a pair of adjustably sized apertures 22 through which the lower portions of sleeves 71, 72 are fixedly positioned by tightening of at least one adjustable fastener (not shown). The triple clamp 20 also includes an aperture 24 positioned centrally but non-collinearly with respect to apertures 22.

Figure 4:
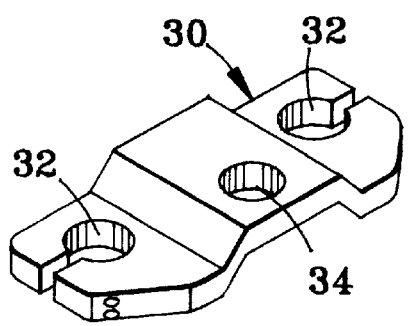
FIG. 4 shows an isometric view of third suspension component in accordance with the present invention.

FIG. 4 shows a third triple clamp 30 that is not a part of the steering frame 6 but is discussed here for clarity. The third triple clamp 30 is similar to the "dove wing" triple clamp 20 except that the intermediate section is now raised from the side sections. The third triple clamp 30 includes two adjustably sized apertures 32 and a central aperture 34 which is non-collinear with apertures 32. The significance of the third triple clamp will be discussed below.

With regard to all of the triple clamps, while some are shown as bent or cast clamps with raised or lowered central areas, it should be noted that flat or bent/cast triple clamps can be used throughout the device. In the embodiment shown in FIG. 1, the bent triple clamps are provided to accommodate a shock absorber 50, discussed below. Accordingly, depending on the size of the shock absorber 50 used, a variety of differently bent/cast or flat triple clamps may be used without departing from the scope of this invention. The triple clamps are composed of a steel or aluminum.

In order to provide upper shock absorption, a variety of shock absorbing members may be provided. First, the sleeves 71, 72 may be closed off at their upper ends, e.g., by a plate welded across their upper openings. Furthermore, similarly to the lower shock absorber, the sleeves 71, 72 may be sealed off by seals 71b, 72b so as to form a shock absorbing chamber with the upper ends 1a, 2a of the elongate members 1, 2. The sealed chambers so created can be filled with a pressurized fluid, e.g. air or hydraulic fluid, and connected to pressurized fluid reservoirs if desired. Alternatively, as shown in FIG. 7, the upper ends 1a, 2a of the elongate members can be provided with pistons 103, 104 to provide a dual direction spring-based shock absorbing system via springs 90 and 92, as discussed above.

Second, in addition to or replacement of the shock absorbing system created by the sleeves 71, 72 and the upper ends 1a, 2a of the elongate member 1, 2, an upper shock absorber 50 is provided within the steering frame 6. In the alternative that the shock absorber 50 is the only shock absorption system to be used, the sleeves 71, 72 may be open, non-shock absorbing systems. The shock absorber 50 is provided as a: hydraulic piston/cylinder system, pneumatic piston/cylinder system or spring-based system.

When the shock absorption is provided by sealed sleeves 71, 72 alone, steering is provided by a conventional steering stem (not shown) located in the central openings 14, 24 of the triple clamps 10, 20, respectively. The bearing being connected to the vehicle frame 60 with the upper triple clamp 10 including a handle bar clamp 5 for a handle (not shown) for steering of the steering frame 6 and entire suspension by an operator. However, when the upper shock absorber 50, as shown in FIG. 1, is provided, the steering stem or shaft is not used. Accordingly, in accordance with the present invention, the upper shock absorber 50 is constructed in such a way as to accommodate shock absorption for motion of the elongate members 1, 2 and steerability of the steering frame 6 and the entire suspension.

In order to provide shock absorption, an upper 52 end (e.g., an uppermost end of a cylinder end of a piston/cylinder system) of the upper shock absorber 50 is attached to the center aperture 14 of the upper triple clamp 10. The lower end (e.g., a rod 54 end of the piston/cylinder system) of the upper shock absorber 50 is attached to the center aperture 34 of the third triple clamp 30. Furthermore, an intermediate portion (e.g., a lowermost end of a cylinder end of a piston/cylinder system) is attached to the second triple clamp 20 such that the rod 54 of the piston/cylinder system is movable freely through the center aperture 24 of the triple clamp 20.

As will be evident to one having ordinary skill in the art, the upper shock absorber 50 can also be reversed, i.e., such that the cylinder of the upper shock absorber 50 is attached to the third triple clamp 30 and the rod 54 is fixed to the second triple clamp 20 and the upper triple clamp 10.

In order to provide steering of the vehicle, the upper shock absorber 50 is connected to the vehicle frame 60 with a pair of spaced tapered roller bearings (e.g. Timkin® bearings) 56 which allow rotational movement of upper shock absorber 50, and hence the steering frame and entire suspension, relative to the vehicle frame 60. A handle bar can be attached to the steering frame 6 by a handle bar clamp 5 attached to the upper triple clamp 10. Accordingly, an operator of the vehicle can steer the suspension by turning of the handle bar (not shown) to turn the steering frame and the entire suspension about the bearings 56. Bearing seals 58 may also be provided between the bearings 56 and triple clamps 10, 20.

Figure 5:
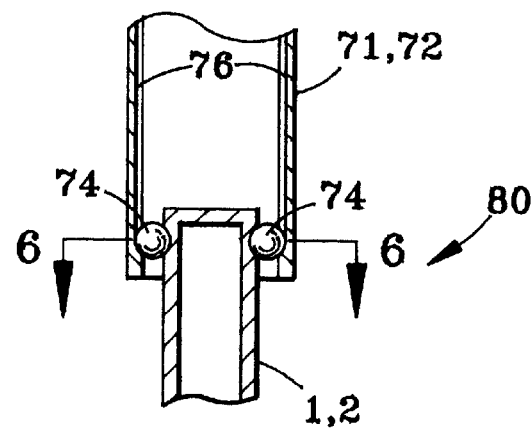
FIG. 5 shows a partial cross-sectional view of an alternative embodiment for a component of the suspension in accordance with the present invention.
Figure 6:
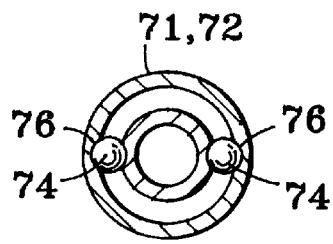
FIG. 6 shows a cross-sectional view 6—6 of the FIG. 5 component.

FIGS. 5 and 6 show an alternative embodiment for the sleeves' 71, 72 and elongate members' 1, 2 telescopic connections. In this alternative, to aid in the sliding action, a bearing 80 is provided between the sleeves 71, 72 and elongate members 1, 2. In particular, the sleeves 71, 72 are constructed to receive ball bearings 74 in a pair of slots 76 formed on an interior thereof. The ball bearings 74 are rotatably encapsulated in the outer periphery of elongate members 1, 2 such that they can rotate between the elongate members 1, 2 and sleeves 71, 72 when the elongate members move within the sleeves 71, 72. Hence, the ball bearings 74 and slots 76 guide and aid in the sliding motion of the elongate members 1, 2 within the sleeves 71, 72. The chamber is sealed such that any fluid provided in the chamber does not escape by a seal (not shown).

In operation, the lower shock absorber 41, 42 and upper shock absorber 50 and/or 71, 72 absorb shock on the vehicle caused by terrain being covered. The upper and lower shock absorbers can be set to different compression forces so that when one shock absorber reaches maximum absorption, e.g., "bottoms out", the other shock absorber can take over at a higher compression. Alternatively, the shock absorber sets can be set at substantially the same compression such that the sets act independently but tend to react symmetrically.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

In particular, while the present invention has been described in conjunction with a front fork of a two wheeled vehicle, it is not to be limited to a motorcycle or bicycle suspension. As should be self-evident, the present invention can be utilized on any wheel, front or back, on any vehicle without departing from the general teachings of the invention. Furthermore, while the invention has been described with regard to a forked suspension, it should not be limited to such a suspension. It is envisioned that the teachings of the present invention may be applied to a single membered suspension. As one with ordinary skill in the art will readily recognize, such a suspension is easily obtainable by removal of one side of the suspension, e.g., by removal of elongate member 2, sleeve 72, and lower shock absorber 42. In this situation, the clamps 10, 20 and 30 would also be shortened by removal of one set of apertures.

What is claimed is:

1. An at least two wheeled vehicle having a suspension, the suspension comprising:
    a steering frame having a pair of clamps connecting a pair of spaced apart sleeves;
    a pair of elongate members having first and second ends and being telescopically received in the pair of sleeves;
    a first shock absorber connected at a first end to the pair of clamps and at a second end to the first end of each of the pair of elongate members; and
    a second shock absorber connected to the second end of each of the pair of elongate members.

2. The at least two wheeled vehicle of claim 1, further comprising an enclosure on each of the sleeves to form a fluidly sealed chamber around each of the elongate members so that the sleeves absorb shock encountered by the elongate members.

3. The at least two wheeled vehicle of claim 1, further comprising a bearing between the each sleeve and elongate member, the bearing having at least one ball bearing positioned in opposing slots in each sleeve and elongate member.

4. The at least two wheeled vehicle of claim 3, wherein the bearing includes two ball bearings.

5. The at least two wheeled vehicle of claim 1, wherein the first shock absorber is one of a hydraulic piston/cylinder system, a pneumatic piston/cylinder system, and a spring system.

6. The at least two wheeled vehicle of claim 1, wherein the steering frame further includes at least one bearing connected to the first shock absorber and to a frame of the vehicle for pivotally supporting the steering frame from a vehicle frame.

7. The at least two wheeled vehicle of claim 1, wherein the first shock absorber is connected to the steering frame such that the first shock absorber is equidistant between the sleeves.

8. The at least two wheeled vehicle of claim 1, wherein the second shock absorbers support a wheel axle.

9. A suspension for a vehicle frame, the suspension comprising:
    a pair of elongate members having first and second ends;
    a steering frame having:
        a pair of clamps connecting a pair of spaced apart sleeves that telescopically receive the pair of elongate members, and
        a shock absorbing steering stem rotatably connecting the pair of clamps to the vehicle frame at one end to allow steering of the suspension, and connecting at a second end to the pair of elongate members to absorb shock encountered by the elongate members; and
    a shock absorber connected to the second end of each of the pair of elongate members to absorb shock encountered by the elongate members.

10. The suspension of claim 9, wherein the shock absorbing steering stem includes a hydraulic or pneumatic piston/cylinder system wherein a cylinder end is connected to the clamps and rotatably connected to the vehicle frame and a piston is connected to the elongate members.

11. An at least two-wheeled vehicle having a suspension, the suspension comprising:
    a pair of elongate members connected by a pair of clamps, each elongate member having an upper end and a lower end;
    a shock absorbing steering stem having a shock absorber at the upper end of the elongate members and at least one bearing coupled to the shock absorber and vehicle frame for rotatably coupling the elongate members to the vehicle frame; and
    a shock absorber connected to the lower end of each of the elongate members.

12. A vehicle suspension comprising:
    a first elongate member having first and second ends;
    a second elongate member having first and second ends;
    a fluid-based shock absorber connected to the first end of the first elongate member;
    a fluid-based shock absorber connected to the second end of the first elongate member;
    a fluid-based shock absorber connected to the first end of the second elongate member;
    a fluid-based shock absorber connected to the second end of the second elongate member; and
    a wheel rotatably positioned between the fluid-based shock absorbers at the second end of the elongate members.

* * * * *